(12) United States Patent
Hagiwara et al.

(10) Patent No.: US 11,792,342 B2
(45) Date of Patent: Oct. 17, 2023

(54) IMAGE FORMING APPARATUS WITH A FIRST DOUBLE-SIDE FEEDING AND A SECOND DOUBLE-SIDE FEEDING

(71) Applicant: CANON KABUSHIKI KAISHA, Tokyo (JP)

(72) Inventors: Hiroshi Hagiwara, Shizuoka (JP); Kosuke Ogino, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/946,190

(22) Filed: Sep. 16, 2022

(65) Prior Publication Data

US 2023/0092601 A1 Mar. 23, 2023

(30) Foreign Application Priority Data

Sep. 22, 2021 (JP) ................................ 2021-153914

(51) Int. Cl.
 *H04N 1/00* (2006.01)
(52) U.S. Cl.
 CPC .............................. *H04N 1/00665* (2013.01)
(58) Field of Classification Search
 CPC ................................................. H04N 1/00665
 USPC ......................................... 358/1.1–1.18, 474
 See application file for complete search history.

(56) References Cited

U.S. PATENT DOCUMENTS

| | | | |
|---|---|---|---|
| 6,188,853 B1* | 2/2001 | Ishida | G03G 15/231 399/306 |
| 6,249,295 B1 | 6/2001 | Kiyohara et al. | |
| 9,071,713 B2* | 6/2015 | Ogata | H04N 1/00572 |
| 11,206,334 B2 | 12/2021 | Hagiwara | |
| 2009/0122365 A1* | 5/2009 | Noda | H04N 1/00413 358/498 |
| 2009/0237687 A1* | 9/2009 | Takata | G06K 15/02 358/1.9 |
| 2012/0120432 A1* | 5/2012 | Hirohata | H04N 1/00801 358/1.13 |

FOREIGN PATENT DOCUMENTS

| | | |
|---|---|---|
| JP | 2002-012374 A | 1/2002 |
| JP | 2011-197392 A | 10/2011 |
| JP | 2018-090417 A | 6/2018 |
| JP | 2020-066512 A | 4/2020 |

* cited by examiner

*Primary Examiner* — Gabriel I Garcia
(74) *Attorney, Agent, or Firm* — Venable LLP

(57) ABSTRACT

An image forming apparatus includes a transfer member, a fixing unit, a double-side feeding path through which the sheet, performed with image formation on a first surface thereof and passed through the fixing unit; is fed to transfer the toner image onto a second surface thereof, a first feeding unit to feed the sheet in the double-side feeding path and a second feeding unit to feed the sheet fed by the first feeding unit toward the transfer member. A controller selects a first double-side feeding control in which the sheet is fed by the second feeding unit or a second double-side feeding control in which the sheet is fed by the first feeding unit and the second feeding unit in a case in which the double-side printing is performed in the second mode.

7 Claims, 11 Drawing Sheets

(a) 2 SHEET CIRCULATION MODE (1ST D-SIDE FEED CONT)

(b) 2 SHEET CIRCULATION MODE (2ND D-SIDE FEED CONT)

(c) 1 SHEET CIRCULATION MODE

IMAGE FORMING APPARATUS WITH A FIRST DOUBLE-SIDE FEEDING AND A SECOND DOUBLE-SIDE FEEDING

FIELD OF THE INVENTION

This invention relates to an image forming apparatus, such as a copy machine or a printer forming images on double sides of a sheet.

DESCRIPTION OF THE RELATED ART

As a system to form an image on both front and back sides of a plurality of sheets (referred as a sheet), there is a circulating sheet-feeding system to adopt. In the circulating sheet feeding system a sheet is fed to a transfer unit transferring an image and the image printed on a first side of the sheet. And then, the sheet is fed to a reversing unit to flip (reverse) and fed to the transfer unit again to transfer an image on a second side. Thus, the sheet is printed on both sides. In order to reduce a gap between sheets to improve productivity, not each sheet by sheet are fed and re-fed for double-side printing, but several sheets are fed at once and printed first sides continuously and then those sheets the image printed on the first side are fed to a double-side feeding path. Afterwards, printing the image on the first side of the sheet newly fed and printing the image on the second side the sheet fed via the double side feeding path are controlled to operate by turns (hereinafter referred as double side circulating control). In the double side printing the number of sheet existing in the image forming apparatus is referred as a double side circulating sheet number. In the case described above, the double side circulating sheet number is 2.

In the image forming apparatus of double side circulating system, the double side feeding path is needed to be short for the image forming apparatus and to be compact and save spaces. For example, in Japan Laid-Open Application (JP-A) 2002-012374, a constitution is proposed that a position the sheet standing by at the double side feeding path is located on the way between a sheet feeding unit forming an image onto the first side and the transferring unit in order to make the double side feeding path short and compact. As a system to make the double side feeding path more compact, increasing a curvature of a double side re-feeding unit for feeding the sheet to the image forming unit from the double side refeeding portion is considered. The distance between the double side refeeding portion and the image forming unit is able to be shorter by increasing the curvature of the double side re-feeding unit. Thus, the image forming unit can be more compact.

SUMMERY OF THE INVENTION

According to an aspect of the present invention, there is provided an image forming apparatus comprising: an image bearing unit configured to bear a toner image; a transfer member configured to transfer the toner image onto a sheet from the imager bearing unit; a fixing unit configured to fix the toner imager transferred by the transfer member on the sheet; a double-side feeding path through which the sheet, performed with image formation on a first surface thereof and passed through the fixing unit; is fed to transfer the toner image onto a second surface thereof; a first feeding unit configured to feed the sheet in the double-side feeding path; a second feeding unit configured to feed the sheet fed by the first feeding unit toward the transfer member; and a control portion configured to perform double-side printing in a first mode in which after the image formation is performed on the first surface of a preceding sheet precedently fed and the second surface on an opposite side of the first surface, and then the image formation is performed on the first surface of a subsequent sheet subsequently fed to the preceding sheet, and in a second mode in which the image formation is performed on the first surface of the subsequent sheet between the image formation of the first sheet of the preceding sheet and the second surface of the preceding sheet, wherein the control portion selects a first double-side feeding control in which the sheet is fed by the second feeding unit or a second double-side feeding control in which the sheet is fed by the first feeding unit and the second feeding unit in a case in which the double-side printing is operated in the second mode.

Further features of the present invention will become apparent from the following description of exemplary embodiments with reference to the attached drawings.

DESCRIPTION OF THE EMBODIMENTS

In the following, embodiments of the present invention will be specifically described with reference to Figures. Note that, constitutional elements shown in the present embodiments are examples, and not limited to the disclosed exemplary embodiments unless described specifically. Further, the sheet previously fed is referred as a preceding sheet and the sheet subsequently fed to the preceding sheet is referred as a subsequent sheet. Each side of the sheet is referred as a first surface and a second surface which is opposite of the first surface.

Embodiment 1

<Overall Constitution and an Image Forming Process>

Figure 1:
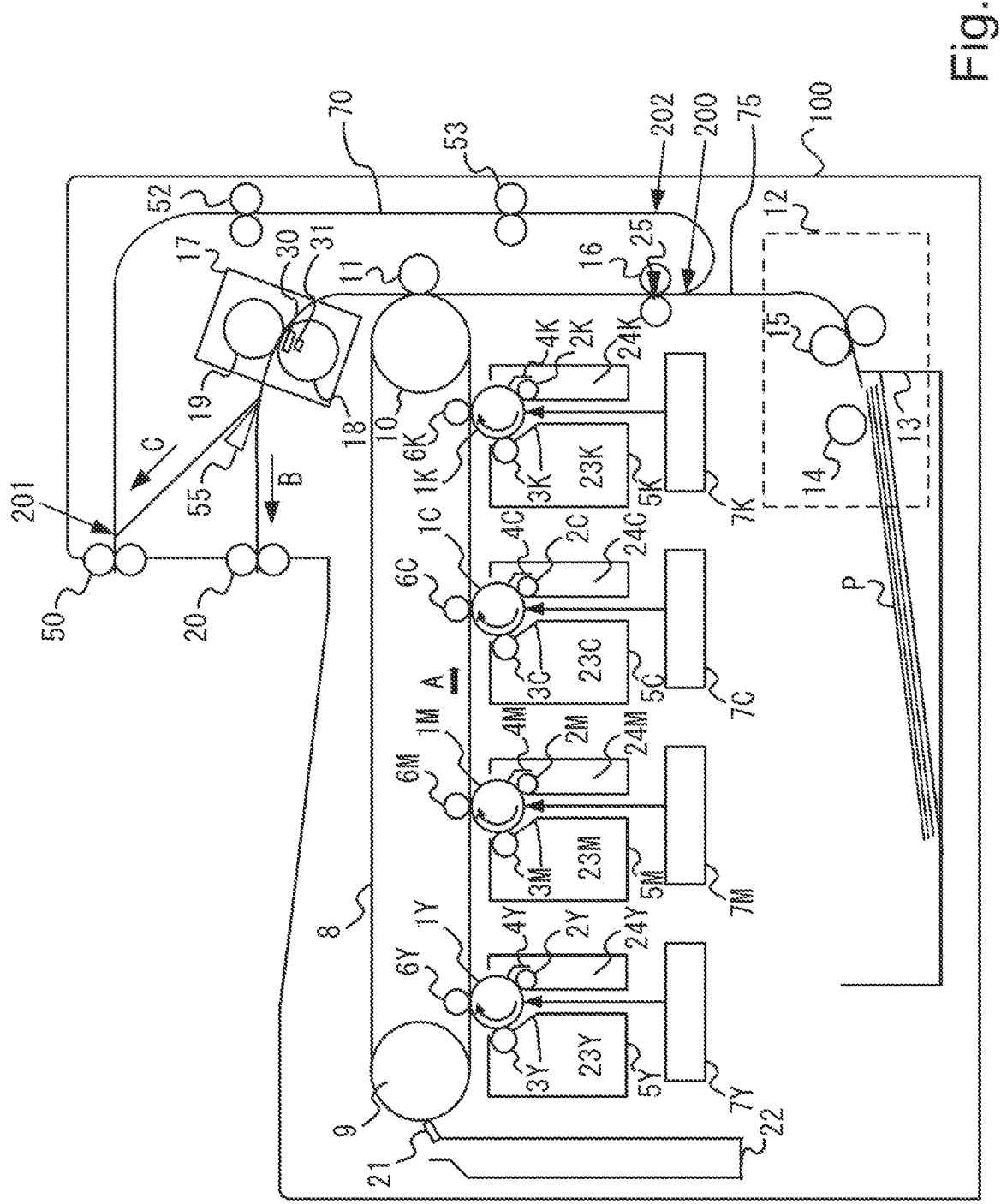
FIG. 1 is a cross-sectional schematic view of an image forming apparatus according to embodiments 1, 2, and 3.

The overall constitution of an image forming apparatus with a multi-colored electrophotographic method will be generally described with reference to FIG. 1. The image forming apparatus according to the embodiment 1 is a laser printer 100 (hereinafter referred as a printer 100) using an image forming process with a multi-colored electrophotographic method. The printer 100 comprises process stations (process cartridges) 5Y, 5M, 5C and 5Ktions, which are detachable from the main body of the printer 100. Four stations 5Y, 5M, 5C and 5K have same constitution but form an image with different colors, i.e., yellow (Y), magenta (M), cyan (C) and black (K). Hereinafter, the marks Y, M, C and K are omitted except when a specific process station is described. Each process station 5 includes a toner container 23, a photosensitive drum 1 as a photosensitive member, a charging roller 2, a developing roller 3, a cleaning blade 4, and a wasted tonner container 24. Underneath the process station 5 an exposing unit exposing onto the photosensitive drum 1 based on a signal of an image is provided.

The photosensitive drum 1 is evenly charged with fixed polarity and potential by the charging roller 2 at the rotating process. Onto the photosensitive drum 1 a latent image is formed according to each targeted color image from a first color component image to a fourth color element image (yellow, magenta, cyan and black element image) by receiving an image exposure from an image exposure unit 7. The charging roller 2 accordingly rotates following the rotation of the photosensitive drum 1. The exposing unit 7 used in the embodiment 1 is a scanner with a laser diode and a rotatable multi-sided mirror, forms an image on the photosensitive drum 1 by a laser light beam modulated according to an image information and forms a latent image.

The latent image formed on the photosensitive drum 1 is developed by a developing roller 3 in each process station such as the first process station 5Y, the second process station 5M, the third station 5C, and the 4th process station 5K. Via the developing roller the latent image on the photosensitive drum 1 is developed as a toner image by depositing a toner of each color. The toner in each developing unit is a nonmagnetic one component toner with a negative charge. The latent image is developed with a nonmagnetic one component contact developing method. A developing charge is applied to the developing roller 3 by the developing voltage source (not showing in the figure). Thus, developing is executed.

An intermediate transfer belt unit which is an image bearing unit holding a toner image comprises an intermediate transfer belt 8, a driving roller 9, and a second transfer counter roller 10. Also, a first transfer roller 6 is located inside of an intermediate transfer belt 8 facing to each photosensitive drum 1 and first transfer voltage with a positive potential is applied by a first transfer voltage source (not showing in the figure). The intermediate transfer belt 8 is driven to rotate by the driving roller 9 rotating with a motor (not showing in the figure), therefore, the second transfer counter roller 10 rotates accordingly. Each photosensitive drum 1 rotates in the direction of an arrow (clockwise direction), the intermediate transfer belt 8 rotates in the direction of an arrow A and the first transfer voltage with positive potential is applied. Thus, the toner image on the photosensitive drum 1 is first-transferred onto the intermediate transfer belt 8 (on the belt) in order beginning the toner image on the photosensitive drum 1Y. After this, the toner image with four colors layered is sent to the second transfer roller 11. A cleaning blade 4 touches and presses on the photosensitive drum 1 to remove the toner non-transferred onto the intermediate transfer belt 8 and remained on the surface of the photosensitive drum 1 (hereinafter referred as a remaining toner) and the other residue. A belt cleaning blade 21 removes the toner remained on the intermediate transfer belt 8 and this removed toner is stored in a container 22.

A feeding/conveying unit 12 includes a sheet feeding roller 14 feeding a sheet P from a sheet feeding cassette 13 storing sheet P and a pair of feeding/conveying rollers 15. The sheet P conveyed from the feeding/conveying unit 12 is fed to a second transfer roller 11 by a pair of a registration rollers 16. A registration sensor 25 detecting whether the sheet P is existing functions as a detecting means located in the lower course in the direction of conveying from a point the sheet P conveyed for re-feeding meets a feeding path 75 as described below, and also in the upper course from a transfer unit as described below. A part of the pathway conveying the sheet P between the pair of the feeding/conveying rollers 15 and the pair of registration rollers 16 is referred as the feeding path 75. The feeding path 75 conveys the sheet P which is transferred a toner image on its first surface from the feeding unit (the feeding/conveying unit 12) feeding the sheet P to the transfer unit. In transferring the toner image from the intermediate transfer belt 8 onto the sheet P, the toner image formed with four colors on the intermediate transfer belt 8 is transferred onto the sheet P by applying a positive voltage to a second transfer roller 11 (hereinafter, referred as a second transfer). A position where the toner image is transferred onto the sheet P i.e., a position of the second transfer roller 11 is a position of the transfer unit. A surface of the sheet P is defined the first surface when the toner image is transferred onto the sheet P fed from the feeding/conveying unit 12.

After the toner image is transferred, the sheet P is fed to a fixing component 17. The fixing component 17 adopts a heating film method and provides a fixing heater 30, a fixing roller built in a temperature sensor to take a temperature of the fixing heater 30, and a pressing roller 19 to press on the fixing roller 18. An unfixing toner image is fixed by heating and pressing the sheet P. And then a fixed toner image as an image formed object (such as a printed sheet) is let out of the printer (device) 100 by a discharge roller 20. In the fixing component 17 an unfixing toner image which is transferred at the transfer unit is fixed on the sheet. The sheet P is discharged from the device in the direction of a discharging direction (an arrow B in FIG. 1). Note that, in the double-side printing, a direction the sheet P is fed by a pair of reversing rollers 50 being described below is a reversing portion direction (an arrow C in FIG. 1) when the sheet P completes the fixing process.

When a back side of the first surface of the sheet P which is a second surface is printed without discharging the sheet P from the device after passing the fixing portion 17, the sheet P passing the fixing portion 17 is fed toward a reversing point 201 to feed the sheet P on a double-side feeding path 70. The double-side feeding path 70 is a feeding route feeding the sheet to transfer the toner image on the second surface of the sheet passing the fixing portion 17. A double-side flapper 55 is able to switch a feeding direction of the sheet P either toward a discharging portion or toward the reversing portion. In double-side printing, before an edge of the sheet P formed image on its first surface (hereinafter referred as image-formed) reaches to the double-side flapper 55, the double-side flapper 55 is switched to the direction of the reversing portion.

After passing the reversing point 201, the sheet P is conveyed to the discharging direction from the device by the pair of reversing rollers 50 once. At a timing when a rear end of the sheet P passes the reversing point 201, the pair of the reversing rollers pause during the sheet P passes the position where the pair of reversing rollers 50. And then the sheet P is fed to the direction of double side feeding path 70 by the pair of reversing rollers rotating opposite direction against the rotating direction by then. In the double side feeding path 70, a pair of double side feeding rollers 52 and a pair of double side re-feeding rollers 53 feed the sheet P to a refeeding stand-by point 202 and a merging point 200. The pair of double side feeding rollers 52 function as a first feeding means which feeds the sheet P in the double side feeding path 70. The pair of double side re-feeding rollers 53 function as a second feeding means which re-feeds the sheet P conveyed by the pair of double side feeding rollers 52 to the transfer unit.

The double side feeding path 70 merges with the feeding path 75 at the merging point 200 between the pair of feeding/conveying rollers 15 and the pair of registration rollers 16. The sheet P flipped upside down is fed to the second transfer roller 11 by the pair of registration rollers 16. And then, the unfixing toner image with four colors on the intermediate transfer belt 8 is transferred onto the second surface of the sheet P. The toner image transferred onto the second surface of the sheet P is fixed in the fixing component 17. The sheet P on which the images are formed on both surfaces is discharged from the device with the discharging roller 20 by switching the double side flapper 55 to the discharging.

<Control Block Diagram>

Figure 2:
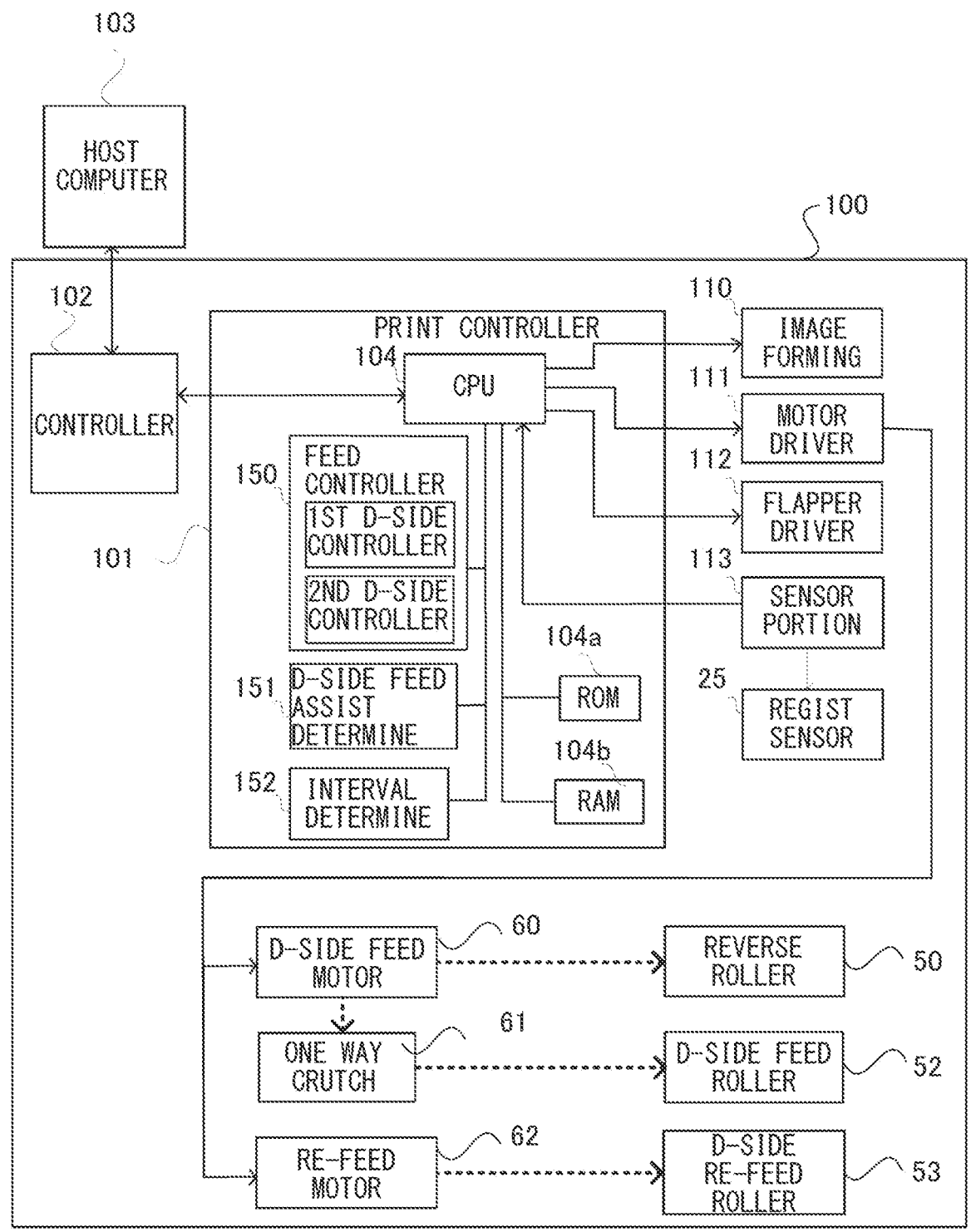
FIG. 2 is a block diagram of the image forming apparatus according to the embodiments 1, 2, and 3.

FIG. 2 is a control block diagram of the printer 100 in the embodiment 1. A printer control unit 101 including circuits such as a CPU 104, a ROM 104a and a RAM 104b executes a program controlling each device in the printer 100. The CPU 104 connecting with the image forming unit 110 including such as a charging voltage source (not showing in the figure), a driving motor unit 111 driving each pair of rollers on the feeding path, and a driving double side flapper unit 112 switching the double side flapper 55 commands each unit to form an image or to feed a sheet. Also, the CPU 104 comprises of a sheet feeding control unit 150 as described below and a double side feeding assisting determination control unit 151 (hereinafter referred as a determination unit 151). These control units command a double side feeding motor 60 via the motor driving unit 111 to feed the sheet P to the double side feeding. Note that, a driving force of the double side feeding motor 60 is configured to transmit to the pair of reversing rollers 50 in both forward and backward rotational direction and to transmit to the pair of double side feeding rollers 52 in forward rotational direction only by a one-way crutch 61. These control units command the double side feeding motor 60 and a re-feeding motor 62 via the motor driving unit 111 to execute double side feeding. Note that, a driving force of the double side feeding motor 60 is configured to transmit to the pair of reversing rollers 50 in both forward and backward rotational direction and to transmit to the pair of double side feeding rollers 52 in forward rotational direction only by a one-way crutch 61. The force of the re-feeding motor 62 is configured to transmit to a double side re-feeding roller 53 as a different driving power source from the double side feeding roller 60.

A sheet feeding control unit 150 includes a first double side feeding control portion 150a controlling a first double side feeding as described below and a second double side feeding control portion 150b controlling a second double side feeding as descried below. The sheet feeding control unit 150 functions as a control means executing a selected command of the double side feeding control by the determination unit 151. The CPU includes an image forming interval determination portion 152 determining an interval of image forming between sheets. Here, between sheets indicates between a rear end of a preceding sheet and a leading end of a subsequent sheet fed following. Also, the interval image forming is referred as an interval between a leading end of a first toner image formed on the preceding sheet and a leading end of a second toner image formed on the subsequent sheet. The CPU 104 is connected with a sensor unit including the registration sensor 25 and the other sensors on the feeding path (not showing in the figure) via a sensor portion 113 and is able to monitor values of each sensor one after another.

A controller 102 connected with the printer control unit 101 instructs the printer control unit 101 to execute such as a printing instruction as following a configuration of a host computer 103 connected with the controller 102 via such as a network or a printer cable. As receiving a printing command from the host computer, the controller 102 analyses image information received and converts into a bit map data. During printing controller 102 synchronizes a TOP signal sent from the printer control unit 101 and sends out the bit map data to the printer control unit 101. A user sets up settings on the host computer 103 such as an information relating a type of the sheet P in the sheet feeding cassette 13 (hereinafter referred as sheet information) which the user can specify and/or use or non-use of a double side feeding assisting control as described below. The information specified by the user is sent to the CPU 104 via the controller 102. Here, the double side feeding assisting control is defined assisting control to prevent the sheet P feeding failure (such as a slipping) in the double side feeding path 70. For example, the host computer 103 functions as an instructing means instructing use or non-use assisting control. Note that, types of sheets indicating information of a type of sheet P are categorized by a basis weight such as a normal paper, a thick paper, a thin paper or a glossy paper.

The CPU may realize each function of the printer control unit 101 by running each control program or an application-specific integrated circuit (ASIC) may execute a part or all the functions. Further, an operation unit (not showing in the figure) receiving an input by a user included in the printer 100 may function as the instructing means.

<Double Side Circulation Control>

Figure 3:
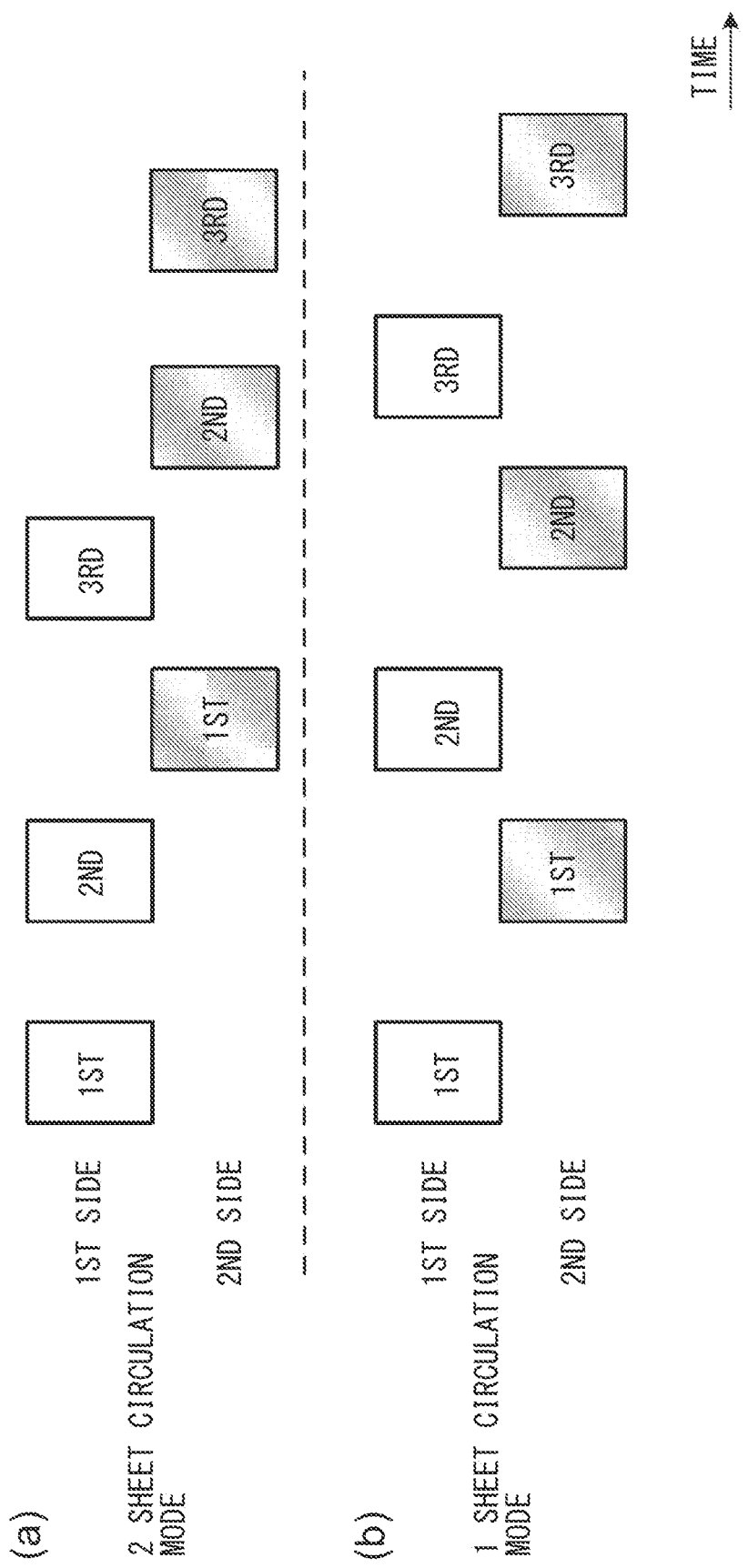
FIG. 3, part (a) and part (b), is a drawing showing a printing order of a circulating double-side printing system according to the embodiments 1, 2, and 3.

A printing order of the double side printing to multiple sheets in a double side circulation control will be described with FIG. 3. In the double side printing on multiple sheets printing operations on first surfaces of a fixed number of sheets are operated first, next the printing operation on a second surface is operated next and then the printing operations of the second surface and the first surface in order like "the second surface is printed and the first surface is printed" are operated alternately. FIG. 3(a) describes a printing order in a case that a first surfaces of first two sheets are printed continuously first, next the second surface and the first surface are printed alternately, and lastly the second surfaces are printed continuously. In FIG. 3(a) an upper row shows the first surfaces and a lower row shows the second surfaces. A time goes from left to right. And each sheet shows which sheet comes next in ordinary numbers. In a case of FIG. 3(a) is referred as a two sheets circulation mode as a second mode because the two sheets are circulating in the feeding path in the printer 100. In the two sheets circulation mode an image is formed on a first surface of a subsequent sheet between an image forming on a first surface of a preceding sheet and an image forming on a second surface of the preceding sheet. Note that, though FIG. 3(a) shows an example that two sheets are circulating, three or more sheets may be circulating. In the other words, two or more subsequent sheets may be image formed between the image forming on the first surface of the preceding sheet and the image forming on the second surface of the preceding sheet.

On the other hand, FIG. 3(b) shows a circulation mode which a second surface of a sheet is printed after printing a first surface of a same sheet and only one sheet is circulating in the feeding path in the printer 100. In a case of FIG. 3(b) is referred as a one sheet circulation mode as a first mode. In the one sheet circulation mode, after image forming on the first surface of the preceding sheet and on the second surface on the preceding sheet, the image is formed on the first surface of the subsequent sheet. According to the embodiment 1, the printer 100 can make double side printing possible with one of the first mode or the second mode.

A time to feed a sheet to the double side feeding path is needed between printing on the first surface of the sheet and printing on the second surface of the same sheet. Thus, a productivity of the one sheet circulation mode is low compared the two sheets circulation mode. The two sheets circulation mode is able to increase productivity more than the one sheet circulation mode by image-forming on the other sheet between image-forming on the first surface of the sheet and image-forming on the second surface of the same sheet. For example, in FIG. 3(a) the first surface of the second sheet is printed between printing the first surface of the first sheet and printing the first sheet of the second sheet, and a first surface of a third sheet is printed between printing the first surface of the first sheet and printing the second surface of the second sheet as well.

According to the embodiment 1 the printer 100 is possible to print on double sides on the sheet which a length in the feeding direction (hereinafter referred as a sheet length) is up to 355.6 mm (equals to a legal size). The productivity is maximized in the two sheets circulation mode when a letter size sheet (sheet length in the feeding direction=279.4 mm) or A4 size sheet (sheet length in the feeding direction=297 mm) is printed. Further, the printer 110 is possible to double-side print in the legal size sheet in the one sheet circulation mode.

<Double Side Feeding Assisting Control Determination Unit>

According to the embodiment 1, the control of determination by the determination unit 151 whether an assistance needed will be described in detail. The determination unit 151 decides to execute or not to execute a second double side feeding control based on sheet information of the sheet P (such as normal paper, thick paper) and information of user definition (Defined, Non-defined) for the double side feeding assisting control (Yes, No) in a Table 1.

TABLE 1

| Sheet Information | User definition | Second double side feeding control |
|---|---|---|
| Plain paper | — | No |
| Thick paper 1 | Non-defined | No |
|  | Defined | Yes |
| Thick paper 2 | — | Yes |
| Glossy paper 1 | Non-defined | No |
|  | Defined | Yes |
| Glossy paper 2 | — | Yes |

The table 1 shows sheet information in a left column, user definition in a middle column, and the second double side feeding control in the right column. For example, when the sheet P is a thick paper 1, if the user defines (Defined) with the double side feeding assisting control, the second double side feeding control is executed (Yes). When the sheet P is the thick paper 1, if the user does not define (Non defined) with the double side feeding assisting control, the second double side feeding control is not executed (No). When the sheet P is a normal paper, even a user definition for double side feeding assisting control (-), the second double side feeding control is not executed (No). Further, when the sheet P is a grossly paper 2, despite user definition for the double side feeding assisting control (-), the second double side feeding control is executed (Yes). Here, in the case that the second double side feeding control is not executed, the first double side feeding control is executed.

As described above, the determination unit 151 selects the first double side feeding control or the second double side feeding control depending on the sheet information of the sheet P. The determination unit 151 selects the second double side feeding control when the double side feeding assisting control is defined and selects the first double side feeding control when the double side feeding assisting control is not defined. Despite of the user defining or non-defining for the double side feeding assisting control, the determination unit 151 selects the first double side feeding control when the sheet P is a normal paper and selects the second double side feeding control when the sheet P is a glossy paper.

The determination unit 151 determines (selects) whether executing the second double 12ide feeding control based on the table 1 in the case of the double side feeding running with the two sheets circulation mode. The determination unit 151 functions as a selecting means selecting either the first double side feeding control or the second double side feeding control when the double side printing is executed in two sheets circulation mode. Note that, the determination unit 151 always selects the second double side feeding control in the embodiment 1 in the case of the one sheet circulation mode. In the embodiment 1, the determination unit 151 always selects the first double side feeding control in spite of the user definition when the sheet information of the first sheet is a plain paper of which stiffness is weak. On the other hand, the determination unit 151 always selects the second double side feeding control when the sheet information of the second sheet is the thick paper 2 or the glossy paper 2 of which stiffness is relative strong (the basis weight is heavy). Also, the determination unit 151 selects the second double side feeding control in only case that the user defines the double side feeding assisting control and selects the first double side feeding control in the other cases when the sheet information is the thick paper 1 or the glossy paper 1 which have middle stiffness. As described above, by restricting options which selects the second double feeding control the image forming interval determination portion 152 describing below can spread intervals of the image forming and can limit the cases of reducing productivity of the image forming.

<The First Double Side Feeding Control>

Figure 4:
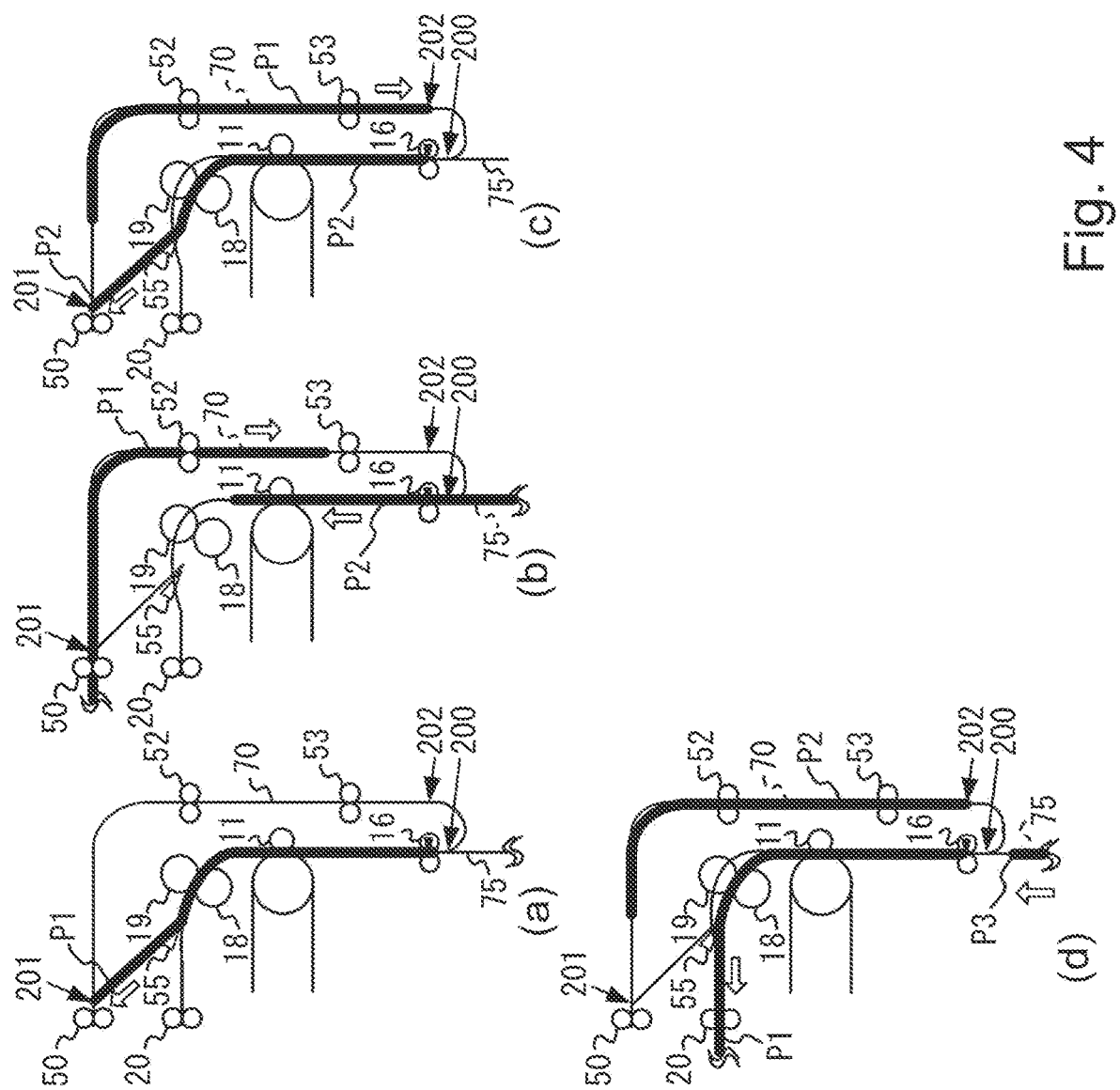
FIG. 4, part (a), part (b), part (c), and part (d), is a schematic diagram of necessary parts showing a state of a sheet in a first double-side feeding control according to the embodiments 1, 2, and 3.
Figure 5:
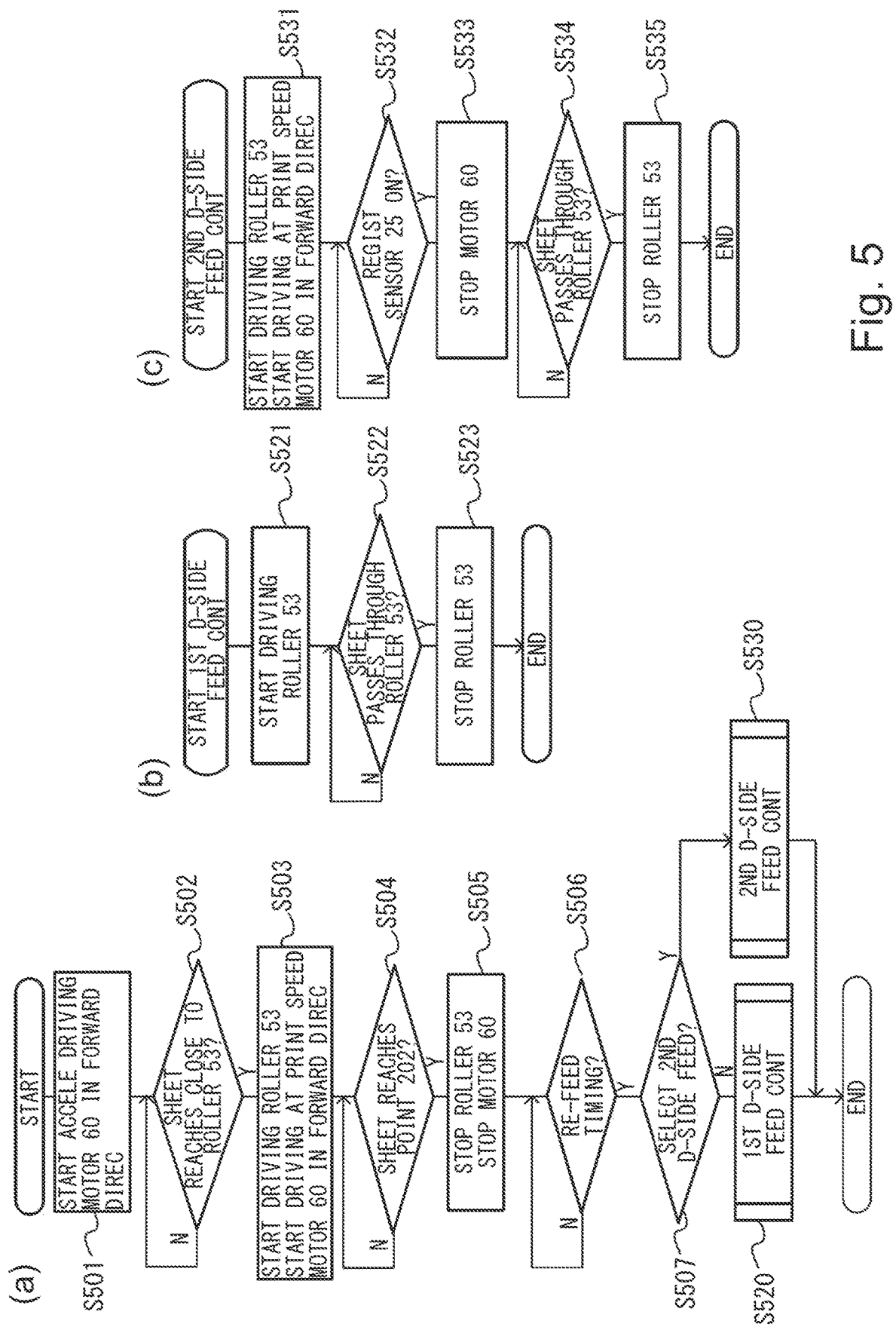
FIG. 5, part (a), part (b), and part (c), is an explanatory flowchart of the double-side feeding control according to the embodiment 1.

The first double side feeding control will be described with the flowchart (a) and (b) in FIG. 5 and FIGS. 4(a),(b), (c), and (d). The first double side feeding control is to control feeding the sheet P with the pair of double side refeeding rollers 53 in the double side printing in the two sheets circulation mode. FIG. 4 shows only main parts of the printer 100 and only main members are numbered. The sheet P fed first is referred as a sheet P1, the sheet P fed secondly right after the first sheet is referred as a sheet P2, and the sheet P fed thirdly right after the second sheet is referred as a sheet P3. A feeding speed during the image forming is referred as a printing speed.

By sending a printing direction from the host computer 103 to the controller 102, the printer control unit 101 commands to execute the double side printing. The printer control 101 forms an image on the first surface of the first sheet P1 with the image forming process described above. The printer control unit 101 commands the double side flapper driving portion 112 to switch the double side flapper 55 in order to guide the sheet P1 in the direction toward the reversing portion where the pair of reversing rollers 50 locating. FIG. 4(a) shows the sheet P1 at this moment. The sheet P1 is fed to the direction of the reversing portion by the double side flapper 55 and a leading end of the sheet P1 reaches to a reversing point.

When the sheet P1 is kept feeding and a rear end of the sheet P1 reaches to a reversing point 201, the printer control unit 101 starts the double side feeding control as FIG. 5(a) showing. In a step (hereinafter, referred as S) S501, the printer control unit 101 drives (hereinafter referred as an accelerating drive) the double side feeding motor 60 in a faster speed than the printing speed in the forward rotating direction. Therefore, the pair of reversing rollers 50 and the pair of double feeding rollers 52 start rotating to the direction which draws the sheet P1 in the double side feeding path 70. In the embodiment 1 the feeding speed of the sheet P1 in the accelerating drive (hereinafter, referred as an accelerating drive speed) is 1.5 times of the printing speed.

In S502 the printer control unit 101 determines whether the leading end of the sheet P1 reaches close to the pair of double side refeeding rollers 53. When the printer control unit 101 determines the leading end of the sheet P1 has not reached close to the pair of double side refeeding rollers 53 in S502, processing is put back in S502. When the printer control unit 101 determines the leading end of the sheet P1 has reached close to the pair of double side refeeding rollers 53 in S502, processing is sent in S503. Note that, the printer control unit 101 determines whether the sheet P reaches close to the pair of refeeding rollers based on a distance along the feeding path between the reversing point 201 and the pair of double side refeeding rollers 53 and the accelerating drive speed by referring a timer (not shown in the figures).

In S503 the printer control unit 101 starts driving the pair of double side refeeding rollers 53 and driving the double side feeding motor 60 which was acceleratedly driven into the printing speed to the forward rotating direction. At the same time, the printer control unit 101 is executing to form an image on the first surface of the sheet P2 during an image forming interval B (describing below) has been passing since the timing when the image formation on the sheet P1 is started. FIG. 4(b) shows the sheet P1 is reaching close to the pair of double side refeeding rollers 53 and the sheet P2 is being image-formed on its first surface by the second transfer roller 11.

In S504 the printer control unit 101 determines whether the leading end of the sheet P1 reaches to the refeeding stand-by point 202. When the printer control unit 101 determines the leading end of the sheet P1 has not reached the refeeding stand-by point 202 in S504, processing is put back to the S504. When the printer control unit 101 determines the leading end of the sheet P1 has reached the refeeding stand-by point 202 in S504, processing is sent in S505. In S505 the printer control unit 101 stops the pair of double side refeeding rollers and stops the pair of double side feeding rollers 52 by stopping the double side feeding motor 60.

In S506 the printer control unit 101 determines whether it is a refeeding timing of the sheet P1. The refeeding timing in S506 is the timing when an image forming interval A (describing below) has passed since the timing when the image formation is started on the first surface of the sheet P2, and is the timing when the image formation is started on the second surface of the sheet P1. When the printer control unit 101 determines it is not the refeeding timing of the sheet P1 in S506, processing is put back in S506. When the printer control unit 101 determines it is the refeeding timing of the sheet P1 in S506, processing is sent in S507. In S507 the printer control unit 101 determines whether the determination unit 151 selected the second double feeding control as described above. When the printer control unit 101 determines that the determination unit 151 did not select the second double side feeding control in S507, processing is sent in S520. When the printer control unit 101 determines the determination unit 151 selected the second double side feeding control, processing is sent in S530. In S520 the printer control unit 101 executes the first double side feeding control by the first double side feeding control portion 150a and ends processing.

FIG. 5(b) is the flowchart showing the first double side feeding control in S520 in FIG. 5(a) which the first double side feeding control portion 150a executes. In S521 the first double side feeding control portion 150a starts driving the pair of double side refeeding rollers 53 to refeed the sheet P1. FIG. 4(c) shows the sheet P1 is refed by the pair of double side refeeding rollers 53.

In S522 the first double side feeding control portion 150a determines whether the rear end of the sheet P1 has passed the pair of double side refeeding rollers 53. When the first double side feeding control portion 150a determines the rear end of the sheet P1 has not passed the pair of double side refeeding rollers 53 in S522, processing is put back in S522. When the first double side feeding control portion 150a determines the rear end of the sheet P1 has passed the pair of double side refeeding rollers 53, processing is sent in S523. In S523 the first double side feeding control portion 150a stops the pair of double side refeeding rollers 53 and ends processing.

After processing described above, the printer control unit 101 forms an image on the second surface of the sheet P1, switches the double side flapper 55 by the double side flapper driving portion 112, and commands to guide the sheet P1 to the direction of discharging. At the same time the printer control unit 101 is feeding the sheet P3 when an image forming interval A (describing below) has been passed since the timing when the image formation on the second surface of sheet P1 is started. FIG. 4(d) shows that the image is being formed on the second surface of the sheet P1 and the sheet P1 is fed to the discharging direction. In FIG. 4(d) the sheet P2 is being fed to the double side feeding path 70 to be formed the image on its second surface, the leading end of the sheet P2 is reaching the refeeding stand-by point 202. Also, the sheet P3 is being fed toward the pair of registration rollers 16. About the image formation the same process will be repeated after the first surface on the sheet P3, thus, the explanations are omitted.

(A Timing Chart of the Double Side Feeding Control)

Figure 6A:
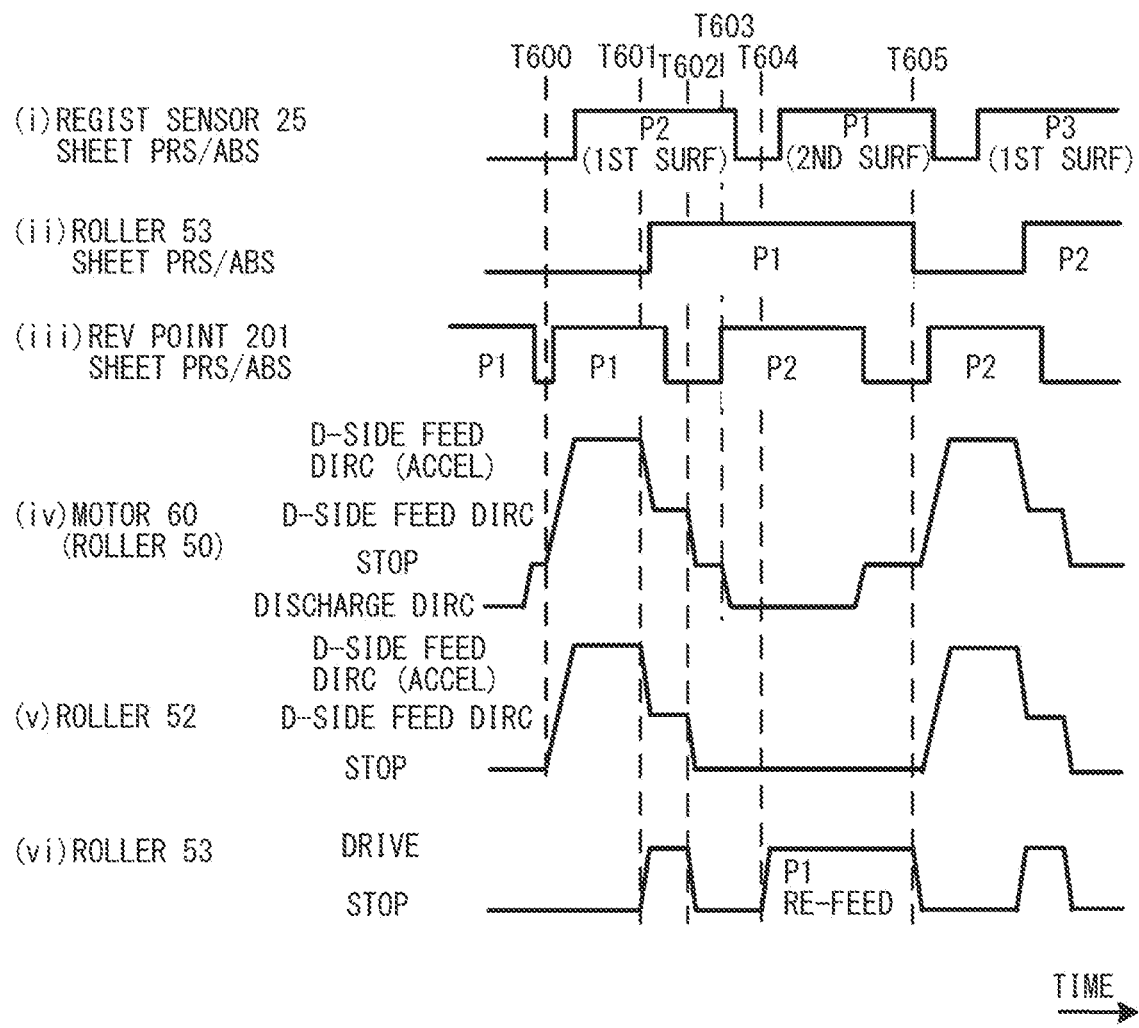
FIG. 6A is a timing chart of the double-side feeding control according to the embodiment 1.

Next, FIG. 6A shows a timing chart when the first double side feeding control is executed. A part (i) showing whether the sheet P is present as detected by the registration sensor 25 indicates with a high line level when the sheet P is present and indicates with a low line level when the sheet P is not present. For example, when the line is in the high level by the sheet P2 is fed for printing on its first surface, a description [P2(1st)] is shown. A part (ii) showing whether the sheet P is present at a position of the pair of double side refeeding rollers 53 indicates with the high line level when the sheet P is present, indicates with the low line level when the sheet P is not present, same as the registration sensor 25, and a corresponding sheet P is shown such as [P1]. A part (iii) showing whether the sheet P is present at a position of the reversing point 201 indicates with the high line level when the sheet P is present, indicates with the low line level when the sheet P is not present, same as the registration sensor 25, and shows which sheet is present, same as the part (ii). A part (iv) shows a driving speed and direction of the double side feeding motor 60, in the other word the pair of reversing rollers 50. The part (iv) indicates with a middle line level when the double side feeding motor 60 is stopping, indicates with a low line level when the double side feeding motor 60 is driving in the discharging direction and indicates with higher lines when the double side feeding motor 60 is driving in a direction of reversing portion. According to the higher lines in the direction of the reversing portion, a mid-high line level indicates the double side feeding direction and a highest line level indicates the double side feeding direction (accelerating). At a portion where the mid-high line is flat on the line level showing the double side feeding direction the driving speed corresponds to the printing speed. At a portion where the highest line is flat on the line level showing the double side feeding direction (accelerating) the driving speed corresponds to an accelerated driving speed which will be described below. A part (v) showing the driving direction of the pair of double feeding rollers 52 is the same as the part (iv) except there is not the reversing direction (the lowest line level indicates the driving stops). A part (vi) shows that the pair of double side refeeding rollers 53 is driving (a high line level) or stopping (a low line level).

Also, an x-axis shows a time and from T600 to T650 indicate a timing in FIG. 6(a). The T600 is a timing when the pair of reversing rollers 50 and the pair of double side feeding rollers 52 start driving by the double side feeding motor 60 accelerated driving in the forward rotating direction in S501 of FIG. 5(a) after the rear end of the sheet P1 has passed the reversing point 201. T601 is a timing when the sheet P1 reaches close to the pair of double side feeding refeeding rollers 53, the pair of double side refeeding rollers 53 is processed to drive in S503 of FIG. 5(a), and the double side feeding motor 60 starts driving in the printing speed.

T602 is a timing when the sheet P1 reaches the refeeding stand-by point 202, the pair of double side refeeding rollers 53 stops in S505 of FIG. 5(a), and the pair of double side feeding rollers 52 stops. T603 is a timing when the first surface of the sheet P2 reaches the reversing point 201 and the pair of reversing rollers 50 starts driving in the discharging direction by the double side feeding motor 60 driving in the opposite rotating direction.

T604 is a timing when the sheet P1 is refed and the pair of double side refeeding rollers 53 starts driving in the S521 of FIG. 5(b) the part (vi) [refeeding P1]. T605 is a timing when the sheet P1 has passed, the pair of double side refeeding rollers 53 stops in the S523 of FIG. 5(b), and the double side feeding control for the sheet P1 ends. The process described above also applies to any sheets after the sheet P2 and the explanation will be omitted.

<The Second Double Side Feeding Control>

Figure 7:
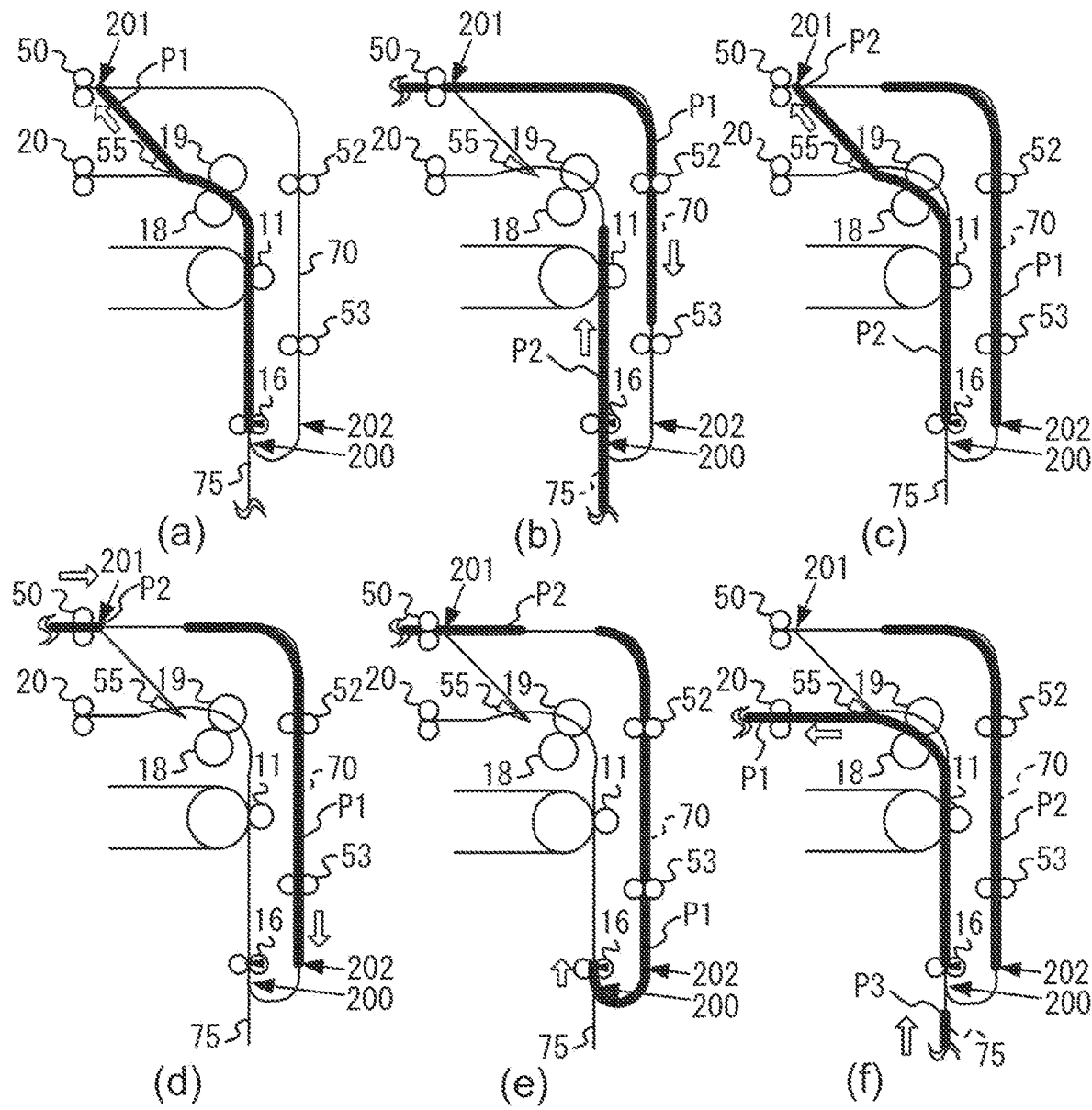
FIG. 7, part (a), part (b), part (c), part (d), part (e), and part (f), is a schematic diagram of necessary parts showing a statement of a sheet in a second double-side feeding control according to the embodiment 1.

Next, the second double side feeding control will be described with a flowchart in FIGS. 5(a), 5(c), FIGS. 7(a), 7(b), 7(c), 7(d), and 7(e). The second double side control controls the pair of double side feeding rollers 52 and the pair of double side refeeding rollers 53 to feed the sheet. In S507 of FIG. 5(a) the printer control unit 101 determines that the second double side control is selected, in S530 the second double side feeding control portion 150b executes the second double side feeding control, and the process ends. FIG. 5(c) is a flowchart showing the second double side feeding control executed in S530 in FIG. 5(a). Regarding to FIG. 7, the sheets P1 and P2 are fed as a state in FIGS. 7(a) and 7(b), and then a state in FIG. 7(c) comes after. In FIGS. 7(a), 7(b), and 7(c) the same processes are shown as FIGS. 4(a), 4(b), and 4(c). Thus, the explanations are omitted.

The printer control unit 101 starts image-forming on the second surface of the sheet P1 at a timing an image forming interval C (describing below) has passed since the timing when the image-forming was started on the first surface of the sheet P2 and waits for a timing when the sheet P1 is refed (S506 in FIG. 5(a)). As the refeeding timing comes, the printer control unit 101 determines that the second double side feeding control is executed by the determination portion 151 described above (S507—Yes in FIG. 5(a)) and starts the second double side feeding control (S530 in FIG. 5(a)).

In S531 the second double side feeding control portion 150b starts driving the pair of double side refeeding rollers 53 and driving the double side feeding motor 60 at the printing speed in the forward rotating direction. Refeeding by two rollers of the pair of double side refeeding rollers 53 and the pair of double side feeding rollers 52 keeps the sheet P1 from slipping at the pair of double side refeeding rollers 53 compared with the first double side feeding control. In the other word, feeding the sheet P1 "is assisted" by two rollers on the double side feeding pathway 70. Also, driving the pair of reversing rollers draw the sheet P2 into the double side feeding pathway as well. FIG. 7(d) shows the pair of double side refeeding rollers 53 and the pair of double side feeding rollers 52 are feeding the sheet P1 on the double side feeding pathway 70.

In S532 the second double side feeding control 150b determines whether the leading end of the sheet P1 reaches the registration sensor 25. When the second double side feeding control 150b determines the leading end of the sheet P1 does not reach the registration sensor 25, the processing is put back in S532. When the second double side feeding control 150b determines the leading end of the sheet P1 reach the registration sensor 25, the processing is sent in S533. In S533 the second double side feeding control 150b stops the pair of double side feeding rollers 52 by stopping the double side feeding motor 60. Note that, in the embodiment 1 the structure which the sheet P1 is gripped by a pair of registration rollers 16 when the sheet P1 reaches the registration sensor 25 is provided. Thus, after this point, the sheet P1 is fed by the pair of the registration rollers 16 and the pair of double side refeeding rollers 53. FIG. 7(e) shows that the pair of registration rollers 16 and the pair of double side refeeding rollers 53 is feeding the sheet P1 heading to be formed the image on its second surface.

In S534 the second double side feeding control 150b determines whether the rear end of the sheet P1 has passed the pair of double side refeeding rollers 53. When the second double side feeding control 150b determines the rear end of the sheet P1 has not passed the pair of double side refeeding rollers 53, the processing is put back in S534. When the second double side feeding control 150b determines the rear end of the sheet P1 has passed the pair of double side refeeding rollers 53, the processing is sent in S535. In S533 the second double side feeding control 150b stops the pair of double side refeeding rollers 53 and ends processing. After that, the printer control unit 101 executes to form the image on the second surface of the sheet P1, switches the double side flapper 55 by the double side flapper driving portion 112, and commands to guide the sheet P1 to the discharging direction. At the same time the printer control unit 101 is feeding the sheet P3 when an image forming interval A (describing below) has passed since the timing when the image formation on the second surface of the sheet P1 started. FIG. 7(f) shows the same state as FIG. 4(d). The controlling described above is repeated to any sheets after the sheet P3.

(Timing Chart of the Second Double Side Feeding Control)

Figure 6B:
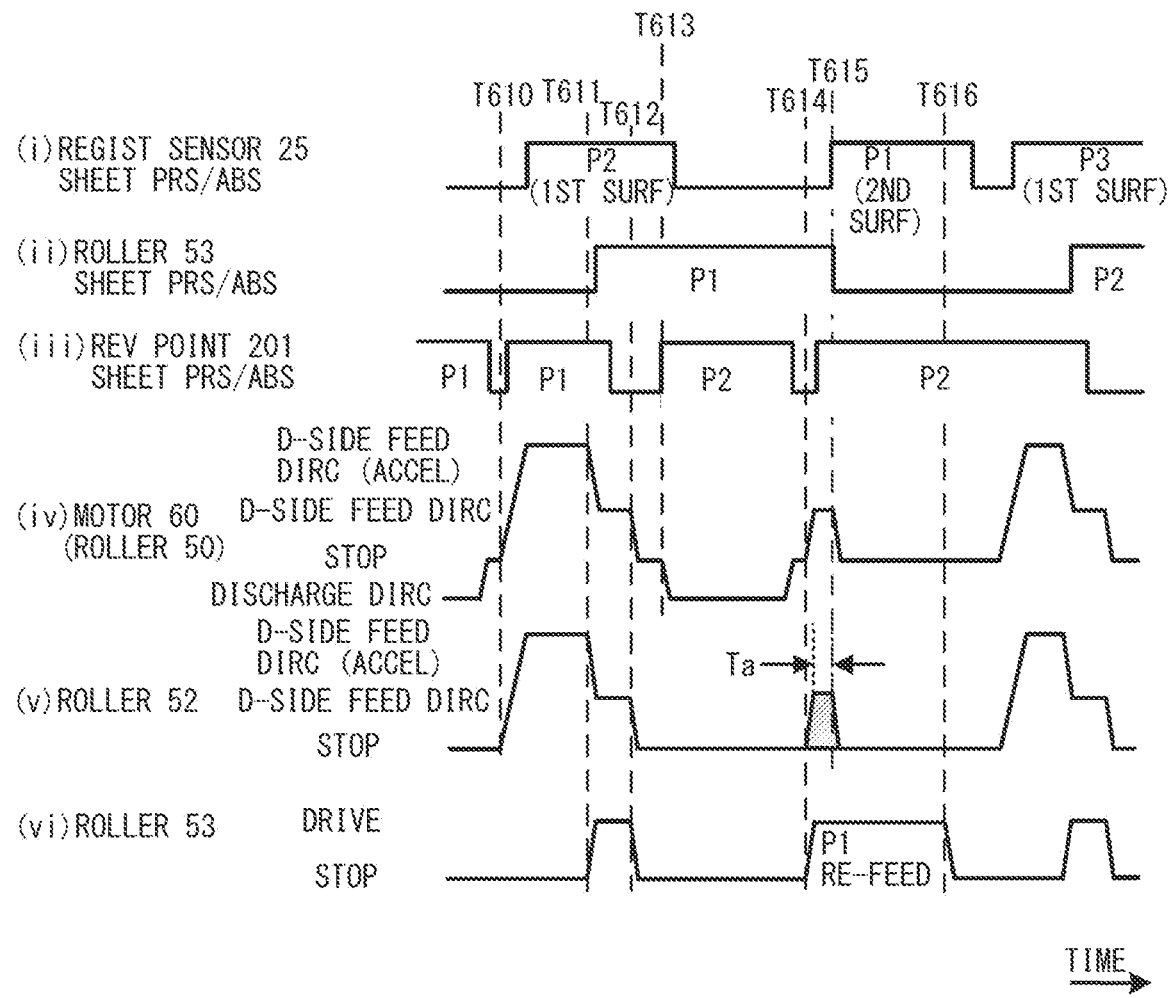
FIG. 6B is a timing chart of the double-side feeding control according to the embodiment 1.

Next, in FIG. 6B is a timing chart showing the second double side feeding control is executed. Parts (i), (ii), (iii), (iv), (v), and (vi) are similar graphs as the parts in FIG. 6A and the explanation of similar parts will be omitted. Also, T610, T611, T612, and T613 in FIG. 6B are same as the T600, T601, T602, and T603 in FIG. 6A and the explanation are omitted.

T614 refeeding the sheet P1 is a timing when the pair of double side refeeding rollers 53 starts driving and the double side feeding motor 60 starts the pair of double feeding rollers 52 to drive in S531 of FIG. 5(c). Also, the sheet P2 is fed to the double side feeding path 70 by the pair of reversing rollers 50.

T615 is a timing when the sheet P1 reaches the registration sensor 25 and the double side feeding motor 60 stops in S533 in FIG. 5(c). Also, feeding the sheet P2 is paused due to the pair of reversing rollers 50 stops. A T616 is a timing when the rear end of the sheet P1 passed through the pair of double side refeeding rollers 53, the pair of double side refeeding rollers 53 stops in S535, and the double side feeding control of the sheet P1 ends.

Here, the sheet P1 is fed by the pair of double side refeeding rollers 53 and the pair of double side feeding rollers 52 during a time range Ta (a shaded rime range) when the pair of double side feeding rollers 52 is driven at the printing speed between T614 and T616 in FIG. 6B. Therefore, a feeding power gets stronger and chances of jamming sheet caused by slipping are reduced as compared with the first double side feeding control.

<Image Forming Interval Determination Portion>

Figure 8:
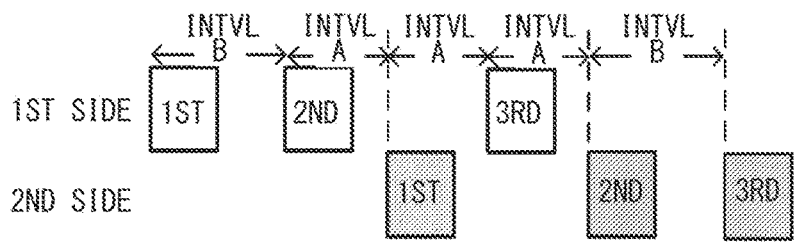
FIG. 8, part (a), part (b), part (c), and part (d), is a drawing and a table showing an image forming intervals of each double-side feeding control according to the embodiment 1.
Figure 8:
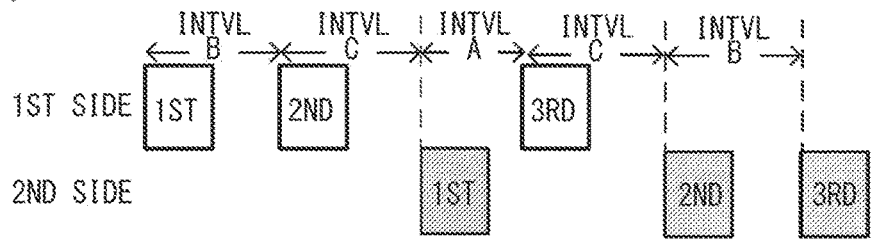
Figure 8:
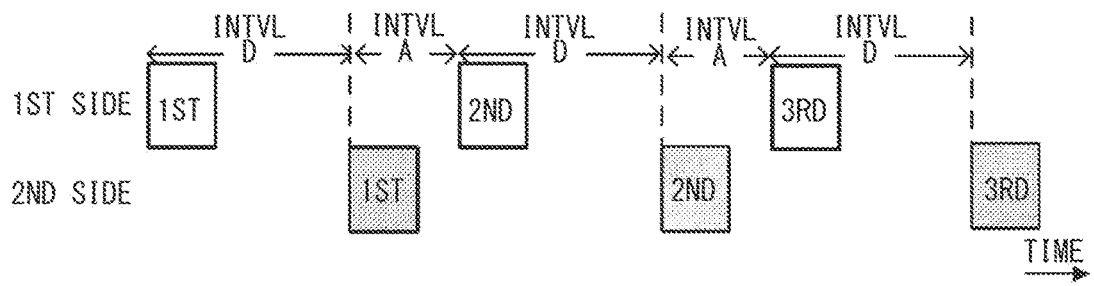
Figure 8:
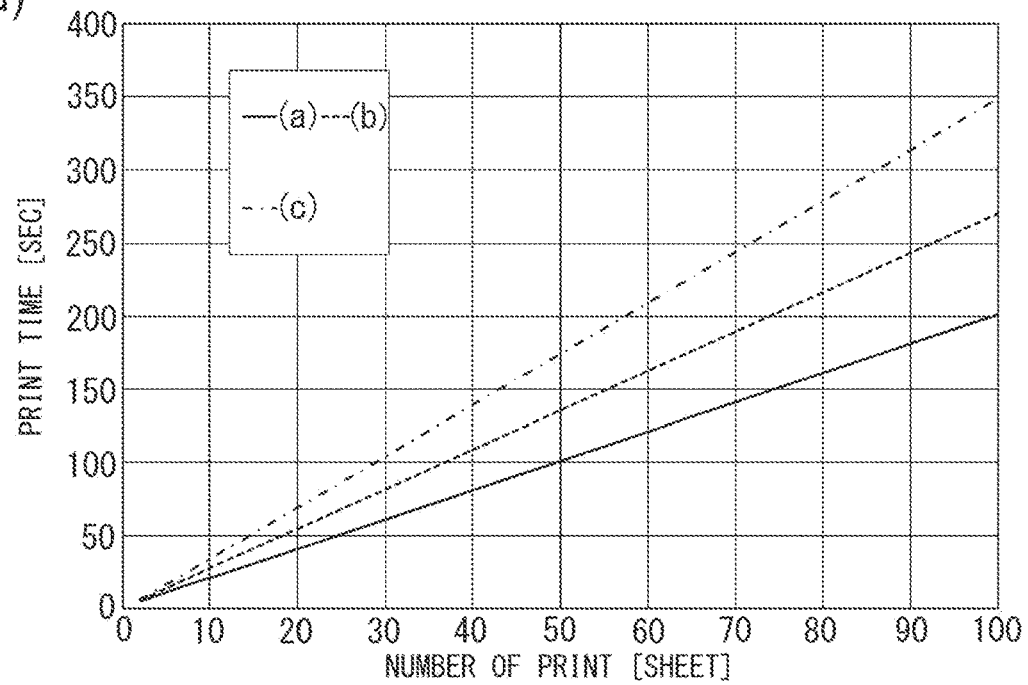

A control the image forming interval determination portion 152 executing will be described with FIG. 8. FIG. 8(a) is a drawing showing an image forming intervals when the first double side feeding control is executed in the two sheets circulating mode, FIG. 8(b) is a drawing showing the image forming intervals when the second double side feeding control is executed in the two sheets circulating mode, and FIG. 8(c) is a drawing showing the image forming intervals in the one sheet circulation mode. The image forming interval determination portion 152 determines the image forming interval by selecting one out of four image forming intervals A, B, C, and D which will be describing below. The image forming intervals A, B, C, an D are design values fixed in advance by the printing speed and length in the feeding direction of each sheet and are selected by each interval indicating in FIGS. 8(a), 8(b), and 8(c). Note that, the image forming interval is referred as the interval in FIG. 8.

The image forming interval A is the same interval with an image forming interval of single side continuous printing which an image is formed on only one surface of several sheets of the sheet P and is a design value fixed in advance to achieve the targeted productivity. In embodiment 1 the image forming interval A in printing on an A4 size sheet is for 1 second for example. The image forming interval B is a design value fixed in advance depending on the printing speed as the preceding sheet and the subsequent sheet are able to pass each other at the reversing point 201. The double side feeding control in the embodiment 1 makes the image forming interval B shorter and increases the productivity by feeding in a faster speed (the accelerated driving speed) than the printing speed after the sheet P reversing at the pair of reversing rollers 50. The image forming interval B is longer than the image forming interval A (B>A). In the embodiment 1, the image forming interval B=the image forming interval A×2. In the example described above the image forming interval B is for 2 seconds (=1 second×2). Also, in the embodiment 1 the image forming interval B is used in between the second surfaces of the last two sheets in the two sheets circulating mode as FIGS. 8(a) and 8(b) showing.

The image forming interval D showing in FIG. 8(c) is an image forming interval on the first surface and on the second sheet of the same sheet in the one sheet circulation mode, and the interval determined by the length of the feeding path in the printer 100 and the time double side feeding control needs for the double side feeding (hereinafter referred as a double side feeding time). The image forming interval D is longer than the image forming interval A (D>A). In the embodiment 1 the image forming interval D=the image forming interval A×2.5. In the example described above the image forming interval D is for 2.5 seconds (=1 second× 2.5). In the embodiment 1 the image forming interval d is longer than the image forming interval B (D>B).

The image forming interval C is an image forming interval between the second surface of the sheet P1 which the double side feeding assisting is defined and the first surface of the sheet P2 which is precedently processing when the second double side feeding control is selected in the two sheets circulation mode. The image forming interval C is a value designed for the rear end of the sheet P2 to pass the reversing point 201 and for the double side feeding motor 60 to be able to switch from the reverse rotating direction to the forward rotating direction at the time when the second double side feeding control starts refeeding the sheet P1 in S531 of FIG. 5(c). The image forming interval C is longer than the image forming interval A (C>A). In the embodiment 1 the image forming interval C=the image forming interval A×1.7. In the example describing above the image forming interval C is for 1.7 seconds (=1 second×1.7). In the embodiment 1 the image forming interval C is shorter than the image forming interval B and the image forming interval D (C<B, C<D). Note that, it is not necessary to increase the image forming interval in the case that the design value of the image forming interval A is great enough that the rear end of the sheet P2 can pass the reversing point 201 when the sheet P1 is started refeeding.

Thus, the image forming interval C=(equals) the image forming interval A. Next, the productivity of each double side feeding control in double side printing will be described with FIG. 8(d).

The sheet feeding control unit 150 controls the image forming interval which is a distance between a leading end of an image formed on a first surface of a subsequent sheet and a leading end of the image formation on a second surface of a preceding sheet as following. The sheet feeding control unit 150 controls the image forming interval in the second double side feeding control (interval C) is always greater than the image forming interval in the first double side feeding control (interval A).

FIG. 8(d) is a graph showing a number of a printing sheet N [sheets] on an x-axis and a time [seconds] required to print some numbers of the sheets (hereinafter, referred as a printing time) on y-axis. In FIG. 8(d) a solid line is showing FIG. 8(a), a dotted line is showing FIG. 8(b), and a chained line (alternate long and short dashed lines) is showing FIG. 8(c). In FIG. 8(a) the printing time is (2×N−3)×A+2×B when the first double side feeding control is used in the two sheets circulation mode. In FIG. 8(b) the printing time is (N−2)×A+(N−1)×C+2×B when the second double side feeding control is used in the two sheets circulation mode. In FIG. 8(c) the printing time is (N−1)×A+N×D in the one sheet circulation mode.

FIG. 8(d) tells the printing time is shorter and the productivity of double printing is increased by the second double side feeding assisting using the second double side feeding control in the two sheets circulation mode (b) than by the double side feeding assisting in the one sheet circulation mode (c). Also, FIG. 8(d) tells the productivity of double side printing decreases in the second double side feeding control comparing with the first double side feeding control. That is, in the case when the double side feeding assisting is not necessary as using a plain paper, the first double side feeding control is more proper. Therefore, the determination unit 151 determines whether the second double side feeding control assisting control according to the sheet information of the sheet P is executed as described in the Table 1.

As described above, by applying each control in the embodiment 1 the pair of double side feeding rollers 52 assisting a power of feeding sheets prevents or decreases the sheet slipping in the case that has a risk of slipping during the double side refeeding a paper with strong stiffness such as a thick paper. Also, the productivity of double side printing can be increased compared with the one sheet circulation mode. In the embodiment 1, though the control is adopted that the pair of double side feeding rollers 52 ends assisting feeding at a timing when the leading end of the sheet reach the pair of registration rollers 16 during the second double side feeding control, the pair of double side feeding rollers 52 may keep driving until the rear end of the sheet has passed by the pair of double side feeding rollers 52 to increase an efficiency of feeding. In this case, the control changing a driving speed synchronized with the double side feeding motor 60 is needed when the driving speed of the pair of double side refeeding rollers 53.

Further, though the sheet information the user defines is used in the embodiment 1, a sheet distinguishing means may be added in the printer 100 and use detecting results instead. Also, in the embodiment 1, though the configuration of the sheet information and/or defining double side feeding assisting control is set on the host computer 103, a control panel which a user can operate may be added in the printer 100 and the user may set up on the control panel instead. Note that, though the embodiment 1 is described with the multi-colored laser beam printer, the present invention is not limited to this type of printer.

As described above, according to the embodiment 1 the sheet slipping happening in the double side feeding path 70 can be decreased as keeping the productivity in the double side printing from decreasing.

Embodiment 2

In the embodiment 2 a method that the determination unit 151 determines whether execute the double side feeding assisting control according to a wear-out degree and a refeeding sheet reaching registration time will be described. Here, the wear-out degree is a degree of wear-out of a member contributing to double side refeeding (hereinafter, referred as a double side refeeding portion). The refeeding sheet reaching registration time is a time that a refed sheet reaches the registration sensor 25. The most parts are same as the embodiment 1 and those descriptions are omitted. Only parts that are different from the embodiment 1 will be described following.

<Double Side Feeding Assisting Control Determination Portion>

Figure 9:
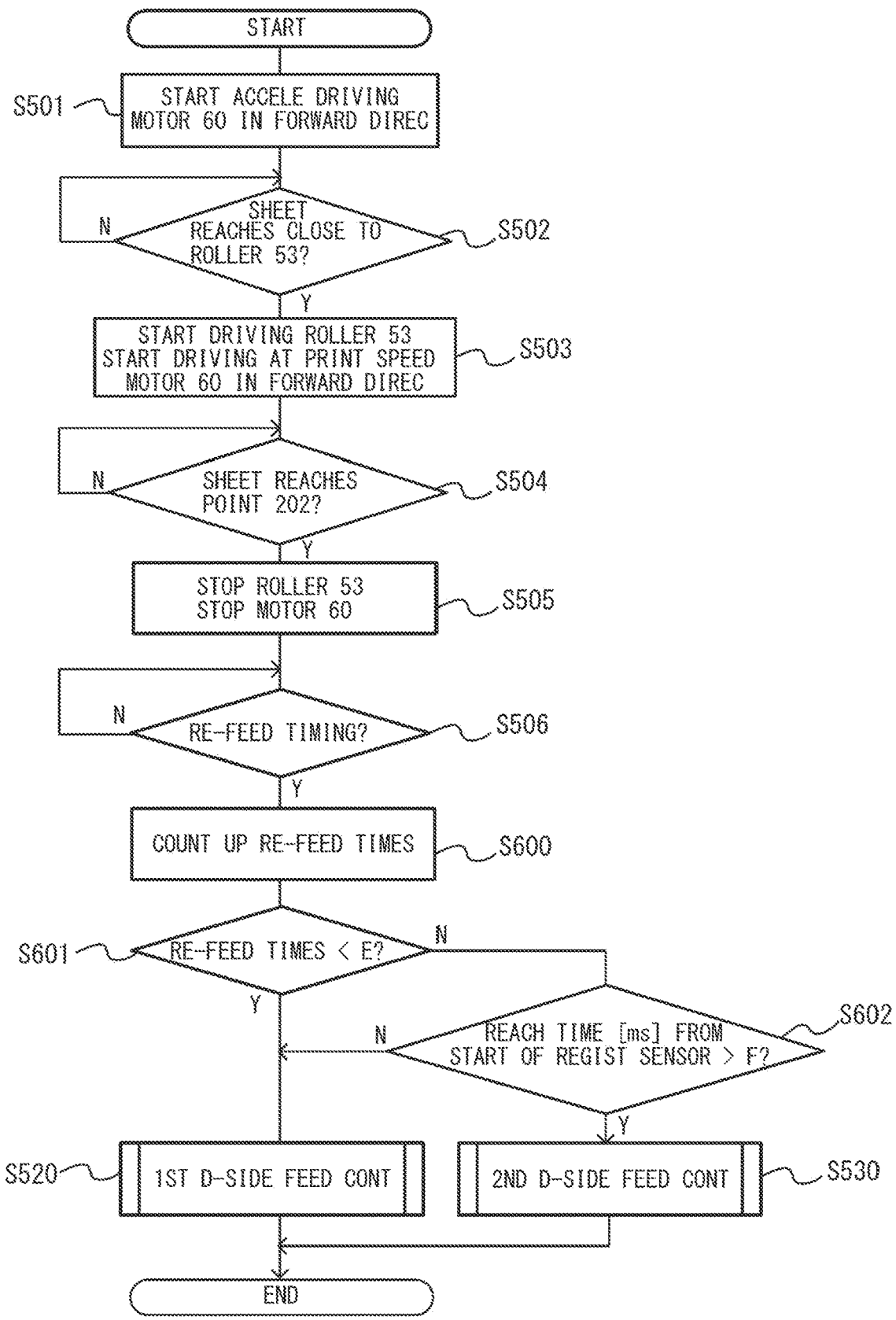
FIG. 9 is an explanatory flowchart of the double-side feeding control according to the embodiment 2.

In the embodiment 2 an assisting need determination control that the determination unit 151 executes will be described with a flowchart in FIG. 9 below. The all steps are the same as the flowchart in FIG. 5 described in the embodiment 1 and marked same step numbers, except S600, S601, and S602 which are processes of the assisting need determination by the determination unit 151 in the embodiment 2. S600, S601, and S602 only which are different steps from the embodiment 1 will be described below. Note that, the printer control unit 101 is regarded as has a counter. Also, the printer control unit 101 makes a timer (not showing) measure the refeeding sheet reaching registration time and memorizes it in such as a RAM 104b every time of refeeding.

When the printer control unit 101 determines a refeeding timing comes in S506, the pair of double side refeeding rollers 53 starts driving to refeed the sheet P1 and the counter which manages a number of executed refeeding (hereinafter, referred as a refeeding execution number) counts in S600. The refeeding execution number is cleared when it is detected that the double side refeeding portion including the pair of double side refeeding rollers 53 is replaced with a new one. For example, when a maintenance service person replaces the double side refeeding portion to a new one, the printer control unit 101 is noticed via the controller 102 and resets the counter.

In S601 the printer control 101 determines whether the counted refeeding execution number is less than a refeeding execution number E which has been fixed in advance. In other words, the printer control unit 101 selects the first double side feeding control or the second double side feeding control by the determination unit 151 based on the number of refeeding. The refeeding execution number E is set up in advance according to a wear-out degree of the pair of double side refeeding rollers 53 causing slips during double side refeeding. In the embodiment 2 the refeeding execution number E is set as 100,000. When the printer control 101 determines the counted refeeding execution number is less than a refeeding execution number E which has been fixed in advance in S601, the printer control unit 101 determines a risk of slips during the double side refeeding is low. Then, the printer control unit selects the first double side feeding control by the determination unit 151 and keeps processing on to S520. As described, the printer control unit selects the first double side feeding control by the determination unit 151 when the number of refeeding is less than the fixed number.

When the printer control 101 determines the counted refeeding execution number is greater than a refeeding execution number E which has been fixed in advance in S601, the printer control unit 101 sends processing to S602. In S602 the printer control 101 determines whether the refeeding sheet reaching registration time memorized in a previous double side refeeding is longer than a refeeding sheet reaching registration time F which has been fixed in advance. In other words, the printer control unit 101 determines whether assisting is needed by a condition of slips during the previous double side refeeding. Here, the refeeding sheet reaching registration time F is set in advance based on such as a distance from the refeeding stand-by point 202 to the registration sensor 25 along with the feeding path (hereinafter, referred as a feeding distance), the printing speed, and a refeeding time variation prospected in normal printing. As described, the determination unit 151 selects the first double side feeding control or the second double side feeding control according to a reaching time when the number of refeeding is greater than the fixed number. Here, the reaching time is defined as a time the leading end of the sheet P taking to reach the registration sensor 25 from a time when refeeding starts in the previous refeeding.

When the printer control 101 determines the refeeding sheet reaching registration time memorized in a previous double side refeeding is longer than a refeeding sheet reaching registration time F which has been fixed in advance in S602, the printer control unit 101 determines a slip occurs in double side refeeding, selects the second double side feeding control, and then sends processing to S530. As described, the printer control unit 101 selects the second double side feeding control by the determination unit 151 when the printer control unit determined the reaching time is longer than the fixed time. When the printer control 101 determines the refeeding sheet reaching registration time memorized in a previous double side refeeding is less than a refeeding sheet reaching registration time F which has been fixed in advance in S602, the printer control unit 101 determines a slip does not occur in double side refeeding, selects the first double side feeding control, and then sends processing to S520. As described, the printer control unit 101 selects the first double side feeding control by the determination unit 151 in the case that the reaching time is less than the fixed time even when the number of refeeding is greater than the fixed number.

As described above, according to the embodiment 2 the printer control unit 101 determines whether to execute the double side feeding assisting control based on the wear-out degree of the double side refeeding portion and the refeeding sheet reaching registration time. Therefore, the slip in double side feeding occurring by the wear-out of the double side refeeding portion can be prevented or decreased, and the productivity of double side printing can be increased as compared with the one sheet circulation mode.

Note that, the present embodiment is not limited in the embodiment 2. Though the printer control unit 101 determines whether to execute the double side feeding assisting control based on the wear-out degree of the double side refeeding portion and the refeeding sheet reaching registration time in the embodiment 2, the printer control unit 101 may determine based on either the wear-out degree of the double side refeeding portion or the refeeding sheet reaching registration time. Also, though the printer control unit 101 determines the wear-out degree of the double side refeeding portion based on the refeeding execution number in the embodiment 2, the same is applied as the embodiment 2 if the wear-out degree of the double side refeeding portion can be determined based on, for example, a cumulative driving time of the pair of double side refeeding rollers 53.

Further, the method of determining the condition of slips during the previous double side refeeding based on the refeeding sheet reaching registration time memorized in a previous double side refeeding was described in the embodiment 2. The same is applied as the embodiment 2 if the condition of slips during double side feeding can be determined based on, for example, the refeeding sheet reaching registration time memorized in not only the previous but several times in the past of double side refeeding, or based on a unit of the feeding distance instead of the feeding time.

As described above, according to the embodiment 2 decreasing the productivity of double side printing can be suppressed and the sheet slipping on the feeding path can be prevented from occurring.

Embodiment 3

In the embodiment 3 a method the determination unit 151 determining whether to execute the double side feeding assisting control based on a history of the type of the sheet P1 fed in the double side refeeding portion will be described. The most parts are same as the embodiment 1 and those descriptions are omitted. Only parts that are different from the embodiment 1 will be described following.

<Double Side Refeeding Assisting Control Determination Portion>

Figure 10:
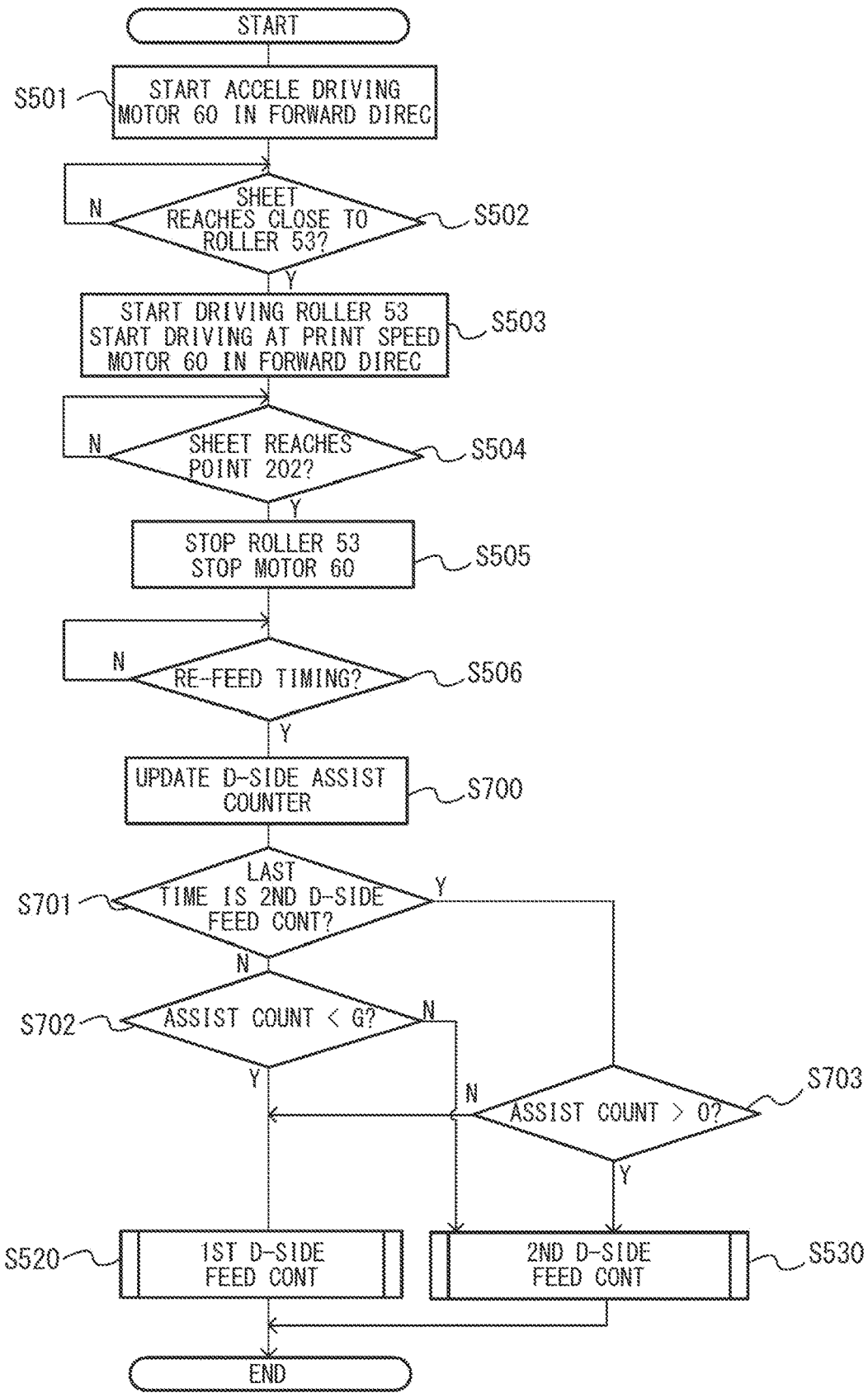
FIG. 10 is an explanatory flowchart of the double-side feeding control according to the embodiment 3.

The assisting need determination control the determination unit 151 executing in the embodiment 3 will be described with a flowchart in FIG. 10. The all steps are the same as the flowchart in FIG. 5 described in the embodiment 1 and marked same step numbers, except S700, S701, S702 and S703 which are processes of the assisting need determination by the determination unit 151 in the embodiment 3. S700, S701, S702, and S703 which are different steps from the embodiment 1 will be described below. Note that, the printer control unit 101 is regarded as including a double side refeeding portion assisting counter (hereinafter, referred as an assisting counter) fluctuating based on an executed refeeding information. Also, the printer control unit 101 measures the refeeding sheet reaching registration time by a timer (not showing in the figure) and memorizes it in such as the RAM 104*b* every time of the assisting control. Further, the printer control unit 101 saves information either the first double side feeding control, or the second double side feeding control was executed in the previous refeeding in the RAM 104*b*.

When the refeeding timing comes in S506, the printer control unit 101 starts driving the pair of double side refeeding rollers 53 to refeed the sheet P1 and renews the assisting counter in S700. The assisting counter is used for prospecting the slipping condition in the double side refeeding portion. The printer control unit 101 renews the assisting counter with adding or subtracting to keep a value from being a negative value according to the type of the sheet the double side refeeding portion feeding based on Table 2.

TABLE 2

| Type of the sheet | Counted value by the assisting counter in the double side refeeding portion |
|---|---|
| Plain paper | +1 |
| Thick paper 1 | 0 |
| Thick paper 2 | 0 |
| Glossy paper 1 | −5 |
| Glossy paper 2 | −5 |

Table 2 shows the type of the sheet in a first column and counted values adding to/subtracting from the assisting counter in a second column. For example, the printer control unit 101 adds 1 to the assisting counter when the sheet P is a plain paper. Also, the printer control unit 101 subtracts 5 from the assisting counter when the sheet P is a glossy paper 1 or a glossy paper 2 as well. The determination unit 151 selects either the first double side feeding control or the second double side feeding control based on the sheet information of the sheet P refed in the past.

The values on Table 2 are set in advance according to the type of the sheet by a degree of contamination on the pair of double side refeeding rollers 53 occurred or left during double side feeding. Among contamination on the pair of double side refeeding rollers 53 a substance such as calcium carbonate is used for filler of the sheet P to improve its preservation and causes slips during double side refeeding. Note that, though the assisting counter is renewed by using values in the table to prospect the condition of slips in the double side refeeding portion in the embodiment 3, the assisting counter may be renewed by a formula as well.

In S701 the printer control unit 101 determines whether the second double side feeding control was executed in the previous double side refeeding. When the printer control unit 101 determines the second double side feeding control was not executed but the first double side feeding was executed in the previous double side refeeding in S701, processing is sent to S702. The printer control unit 101 keeps processing on to S702 to select either the first double side feeding control or the second double side feeding control according to the value of the assisting counter when the determination unit 151 did not select the second double side feeding control during the previous refeeding. In S702 the printer control unit 101 determines whether the assisting counter is less than a counted value G fixed in advance. The counted value G is fixed in advance according to the degree of contamination on the pair of double refeeding rollers 53 causing slips in the double side refeeding. In the embodiment 3 the counted value G is set as G=100.

The printer control unit 101 determines a possibility of slip occurring is low, selects the first double side feeding control, and sends the processing to S520 when the printer control unit 101 determines that the assisting counter is less than the counted value G fixed in advance in S702. As described, the printer control unit 101 selects the first double side feeding control when the determination unit 151 determines the assisting counter is less than a first fixed value. The printer control unit 101 determines the possibility of slips occurring in the double side refeeding is high, selects to execute the second double side feeding control, and sends processing on to S530 when the printer control unit 101 determines the assisting counter is greater than the counted value G fixed in advance in S702. As described, the printer control unit 101 selects the second double side feeding control when the determination unit 151 determines the assisting counter is greater than the first fixed value.

When the printer control unit 101 determines not the first double side feeding control but the second double side feeding control was executed in the previous double side refeeding in S702, processing is sent to S703. In S703 the printer control unit 101 determines whether the assisting counter is greater than zero. The printer control unit 101 determines the possibility of slips occurring in the double side refeeding is high, selects to execute the second double side feeding control, and sends processing on to S530 when the printer control unit 101 determines the assisting counter is greater than zero in S703.

When the printer control unit 101 determines that the assisting counter is less than zero in S703, the printer control unit 101 determines a possibility of slip occurring is low, selects the first double side feeding control, and sends the processing to S520. As described, the printer control unit 101 selects the first double side feeding control when the determination unit 151 determines the second double side feeding control was selected in the previous refeeding and the assisting counter is less than a second fixed value. The printer control unit 101 selects the second double side feeding control when the determination unit 151 determines the assisting counter is greater than the second fixed value. The second fixed value (=0) is less than the first fixed value (=100) (the second fixed value <the first fixed value). Here, the reason why the assisting need for double side feeding is determined by whether the assisting counter is zero is as follows. Once a situation having a possibility of slips in double side refeeding arises, the second double side feeding control has been executed until the possibility of slips in double side refeeding is decreased.

As described above, according to the embodiment 3 whether to execute the double side feeding assisting is determined based on the history of the type of the sheet fed in the double side refeeding portion. Therefore, the slips in double side refeeding occurring by contamination of the double side refeeding portion is prevented or decreased and the productivity of double side printing can be increased as compared with the one sheet circulation mode.

Note that, an embodiment is limited to the embodiment 3. For example, in the embodiment 3 a method contamination on the double side refeeding portion is prospected with the assisting counter. However, for example, a distance feeding the sheet with the pair of double side refeeding rollers 53 can be applied to the embodiment 3 as well, if contamination on the double side refeeding portion which causes slips in double side refeeding is able to be determined.

As described above, according to the embodiment 3, it is possible to decrease the slips of the sheet occurring in the double side feeding path while suppressing the productivity of double side printing decreasing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-153914 filed on Sep. 22, 2021, which is hereby incorporated by reference herein in its entirety.

What is claimed is:
1. An image forming apparatus comprising:
an image bearing unit configured to bear a toner image;
a transfer member configured to transfer the toner image onto a sheet from the imager bearing unit;
a fixing unit configured to fix the toner imager transferred by the transfer member on the sheet;
a double-side feeding path through which the sheet, performed with image formation on a first surface thereof and passed through the fixing unit; is fed to transfer the toner image onto a second surface thereof;
a first feeding unit configured to feed the sheet in the double-side feeding path;
a second feeding unit configured to feed the sheet fed by the first feeding unit toward the transfer member; and
a control portion configured to perform double-side printing in a first mode in which after the image formation is performed on the first surface of a preceding sheet precedently fed and the second surface on an opposite side of the first surface, and then the image formation is performed on the first surface of a subsequent sheet subsequently fed to the preceding sheet, and in a second mode in which the image formation is performed on the first surface of the subsequent sheet between the image formation of the first sheet of the preceding sheet and the second surface of the preceding sheet, wherein the control portion selects a first double-side feeding control in which the sheet is fed by the second feeding unit or a second double-side feeding control in which the sheet is fed by the first feeding unit and the second feeding unit in a case in which the double-side printing is performed in the second mode.

2. An image forming apparatus according to claim 1, wherein the control portion controls in the second mode so that an image forming interval in performing the second double-side feeding control is longer than an image forming interval in performing the first double-side feeding control, the image forming interval being a distance between a leading end of the image formed on the first surface of the subsequent sheet and a leading end of the image formed on the second surface of the preceding sheet.

3. An image forming apparatus according to claim 2, wherein the control portion selects the first double-side feeding control or the second double-side feeding control based on information on a kind of the sheet.

4. An image forming apparatus according to claim 3, wherein the control portion selects the second double-side feeding control in a case in which a use is allowed to designate an assist control and the assist control is designated, and selects the first double-side feeding control in a case in which the assist control is designated.

5. An image forming apparatus according to claim 4, wherein the control portion selects the first double-side feeding control when the sheet is a first sheet and selects the second double-side feeding control when the sheet is a second sheet thicker that the first sheet.

6. An image forming apparatus according to claim 1, wherein the control portion selects the first double-side feeding control or the second double-side feeding control based on the number of times the sheet is fed by the second feeding unit.

7. An image forming apparatus according to claim 6, wherein the control portion selects the first double-side feeding control in a case in which the number of times the sheet is fed by the second feeding unit smaller than a predetermined number of times.

* * * * *